(12) United States Patent
Zhao et al.

(10) Patent No.: US 9,483,727 B2
(45) Date of Patent: Nov. 1, 2016

(54) REDUCTION OF COMPUTATION COMPLEXITY OF NEURAL NETWORK SENSITIVITY ANALYSIS

(71) Applicant: FAIR ISAAC CORPORATION, San Jose, CA (US)

(72) Inventors: Xing Zhao, San Diego, CA (US); Peter Hamilton, Novato, CA (US); Andrew K. Story, Petaluma, CA (US)

(73) Assignee: FAIR ISAAC CORPORATION, San Jose, CA (US)

( * ) Notice: Subject to any disclaimer, the term of this patent is extended or adjusted under 35 U.S.C. 154(b) by 294 days.

(21) Appl. No.: 14/030,834

(22) Filed: Sep. 18, 2013

(65) Prior Publication Data

US 2015/0081606 A1   Mar. 19, 2015

(51) Int. Cl.
*G06N 3/08* (2006.01)

(52) U.S. Cl.
CPC ...................................... *G06N 3/08* (2013.01)

(58) Field of Classification Search
CPC ........................................................ G06N 3/02
See application file for complete search history.

(56) References Cited

PUBLICATIONS

S. Russell and P. Norvig, Artificial Intelligence: A Modern Approach, 2nd Ed., 2003, pp. 736-748.*
J. Yang et al., "Computation of Two-Layer Perceptron Networks Sensitivity to Input Perturbation", Proc. 7th Int'l Conf. on Mach. Learning and Cybernetics, IEEE, Jul. 2008, pp. 762-767.*
A. Downey et al., How to Think Like a Computer Scientist, Green Tea Press, Wellesley MA, 2002, pp. 4, 12, and 13.*
U. Drepper, "What Every Programmer Should Know About Memory", 2007, available at www.akkadia.org/drepper/cpumemory.pdf, retrieved Aug. 18, 2015, 114 pages.*
Hamby. "A Comparison of Sensitivity Analysis Techniques." *Health Physics Society*. Health Phys. Feb. 1995;68(2):195-204.

* cited by examiner

*Primary Examiner* — Kakali Chaki
*Assistant Examiner* — Vincent Gonzales
(74) *Attorney, Agent, or Firm* — Mintz Levin Cohn Ferris Glovsky and Popeo, P.C.

(57) ABSTRACT

As part of neural network sensitivity analysis, base outputs of hidden layer nodes of a neural network model for non-perturbed variables can be reused when perturbing the variables. Such an arrangement greatly reduces complexity of the calculations required to generate outputs of the model. Related apparatus, systems, techniques and articles are also described.

9 Claims, 3 Drawing Sheets

REDUCTION OF COMPUTATION COMPLEXITY OF NEURAL NETWORK SENSITIVITY ANALYSIS

TECHNICAL FIELD

The subject matter described herein relates to increasing the efficiency of neural network sensitivity analysis.

BACKGROUND

Feedforward neural networks have been widely used for function approximation, regression, classification and pattern recognition. FIG. 1 is a diagram 100 illustrating a typical feedfoward neural network with one hidden layer. In such a network, the input variables are the nodes in the input layer. Their values are propagated through the hidden layers to the output layer. The model score is the output value of the node in the output layer.

Sensitivity, in this context, refers to how a neural network output is influenced by its perturbations of the values corresponding to the input variables. One of the most important uses of sensitivity analysis is to estimate the importance of different model inputs. Sensitivity analysis results can help a modeler understand the model and to select/discriminate among various input variables.

There are several conventional techniques for sensitivity analysis. One such technique is differential sensitivity analysis which also referred to as the direct method. This technique is based on partial differentiation of the aggregated model. The sensitivity coefficient for a particular independent variable is calculated from the partial derivative of the dependent variable with respect to the independent variable. In these calculations, all parameters are set equal to their mean value.

Other techniques are referred to as indirect methods in that they do not use partial derivatives. These techniques adjust the input variable value by some amount and calculate the model score changes. By aggregating the model score changes for all records, each algorithm will have a measure of the sensitivity of the independent variable. These techniques can be generalized with several key steps.

$$s_j = f(x_{1j}, x_{2j}, \ldots, x_{Nj})$$

Here $s_j$ is the score of record j, with j as the record index, N the number of input variables, $x_{ij}$ is the value of input variable i on the j record.

$$s_j(\Delta x_{kj}) = f(x_{1j}, x_{2j}, \ldots, x_{kj} + \Delta x_{kj}, \ldots, x_{Nj})$$

Here $s_j(\Delta x_{kj})$ is the changed score when input variable k is perturbed for record j.

Different methods perturb the input variables differently. For example, some use a percentage (e.g., 20%) change of the base case value. Some methods use one standard deviation of the input variable. With all the score changes for each record, the sensitivity of variable k is usually an aggregation of these changes. For example, the variance of score changes can be used to measure variable sensitivity.

As can be appreciated, to calculate the sensitivity of each input variable, the score changes for all records are required. In other words, one requires $s_j(\Delta x_{kj})$ for all records and all input variables. This arrangement requires J*N times of model score calculation, where J is the number of records. For each model scoring $s_j(\Delta x_{kj})$, its complexity usually increases with the number of input variables. When N is big, the complexity of model scoring is approximately O(N). Thus the total complexity of sensitivity analysis is approximately o(N*N*J). When there are many input variables, a thorough sensitivity analysis can be very slow (as it consumes significant processing resources).

SUMMARY

In one aspect, a plurality of records can be received (either locally or remotely) that each comprise input variables for a plurality of input layer nodes forming part of a neural network. Thereafter, for each record, the input variables are inputted into corresponding input layer nodes to generate a base output for each of a plurality of first hidden layer nodes forming part of the neural network (which can be cached for subsequent re-use) so that a non-perturbed output of the neural network is generated. Subsequently, each input variable, for each record, is perturbed so that an output for the first hidden layer nodes can be generated by reusing the corresponding generated base outputs and a perturbed output for the neural network can be generated. Such information can be used to initiate sensitivity analysis of the neural network sensitivity by comparing the non-perturbed outputs with the perturbed outputs across the input layer nodes.

The base outputs can $a_i$ determined using:

$$a_i = \sum_{j=1}^{N} w_{ij} x_j + b_i$$

where i is an index of the first hidden layer nodes, j is an index of input variables, x is the input variable, $w_{ij}$ is weight from input node j to hidden node i, and $b_i$ is bias for hidden node i.

For a perturbed input variable k that is perturbed by $\Delta$, the output for the first hidden layer nodes that reuses the corresponding cached generated base output can use:

$$a_i(k) = \sum_{j=1}^{N} w_{ij} x_j + b_i + \Delta x_k * w_{ik} = a_i + \Delta x_k * w_{ik}$$

In an interrelated aspect, base outputs are generated for each of a plurality of hidden nodes of a neural network using non-perturbed input variables. Thereafter, an output of the neural network model is generated using perturbed input variables and by reusing the generated base outputs. The output can be then provided (e.g., displayed, transmitted, stored, loaded, etc.).

Common indirect sensitivity analysis methods need to evaluate model scores for all records and all input perturbations which requires J*N score evaluations. When there are many input variables, each score evaluation has approximately O(N) complexity. Thus the total complexity of sensitivity analysis is approximately O(J*N*N).

The current subject matter can reduce the complexity of score calculation needed for sensitivity analysis. For first hidden layer nodes, by caching the base output, the perturbed output can be calculated efficiently with O(1) complexity. Thus, the total complexity of sensitivity analysis can be reduced to approximately O(J*N). Such an arrangement can be used for indirect sensitivity analysis methods in which the perturbed scores for all input variables are required. Further, with the current subject matter, the greater the number of input layer input variables, the more effective the current subject matter is in reducing processing time and consumption of processing resources.

Non-transitory computer program products (i.e., physically embodied computer program products) are also described that store instructions, which when executed one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter more rapidly provides neural network sensitivity analysis while, at the same time, consuming fewer processing resources.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter reduces the complexity of neural network sensitivity analysis. With the current subject matter, given each record, the score changes for all variables are calculated together. Because of the similarity between these score changes and the structure of the neural network, there is efficient way to reduce computation complexity for sensitivity analysis.

Figure 1:
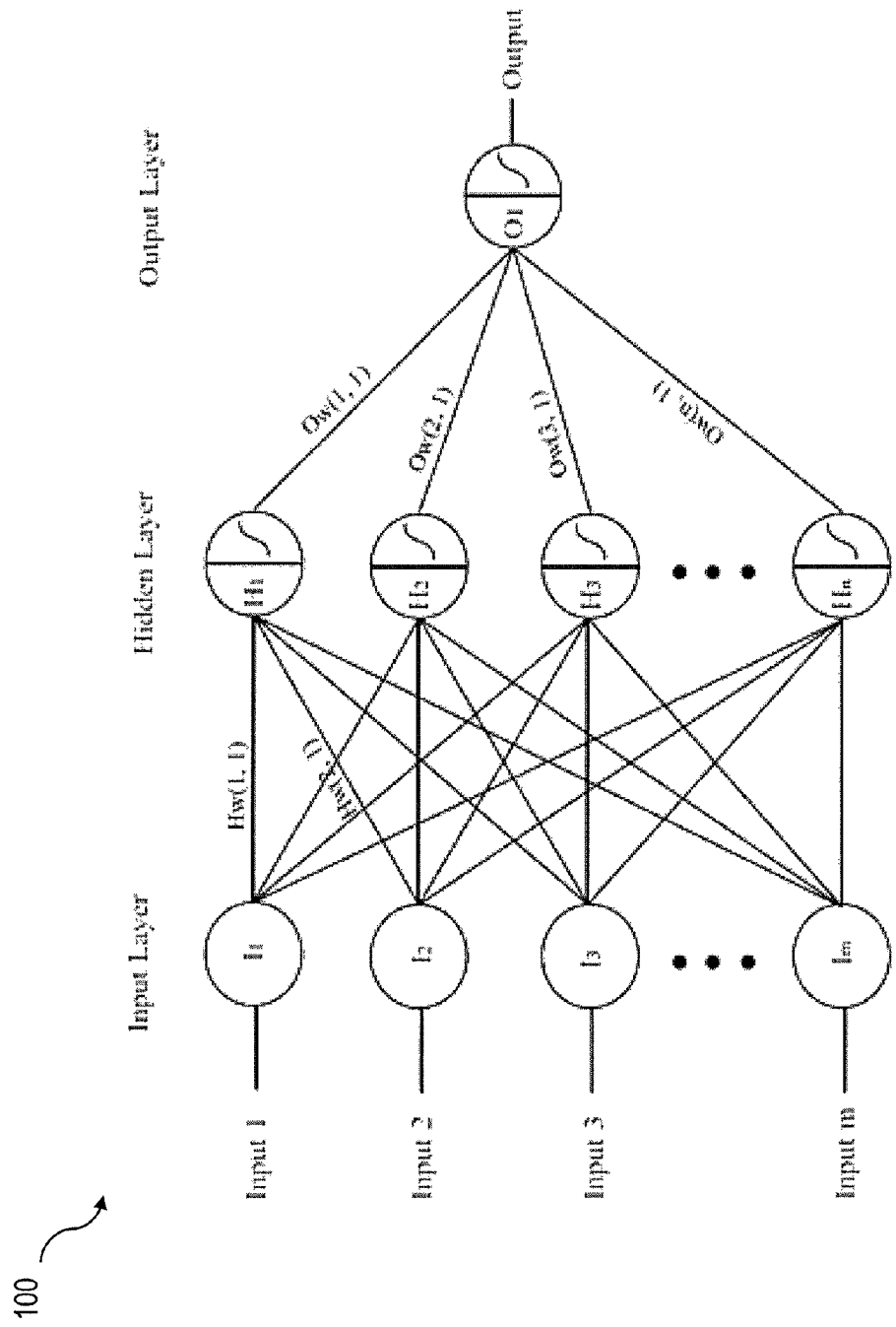
FIG. 1 is a first diagram illustrating a neural network node structure.
Figure 2:
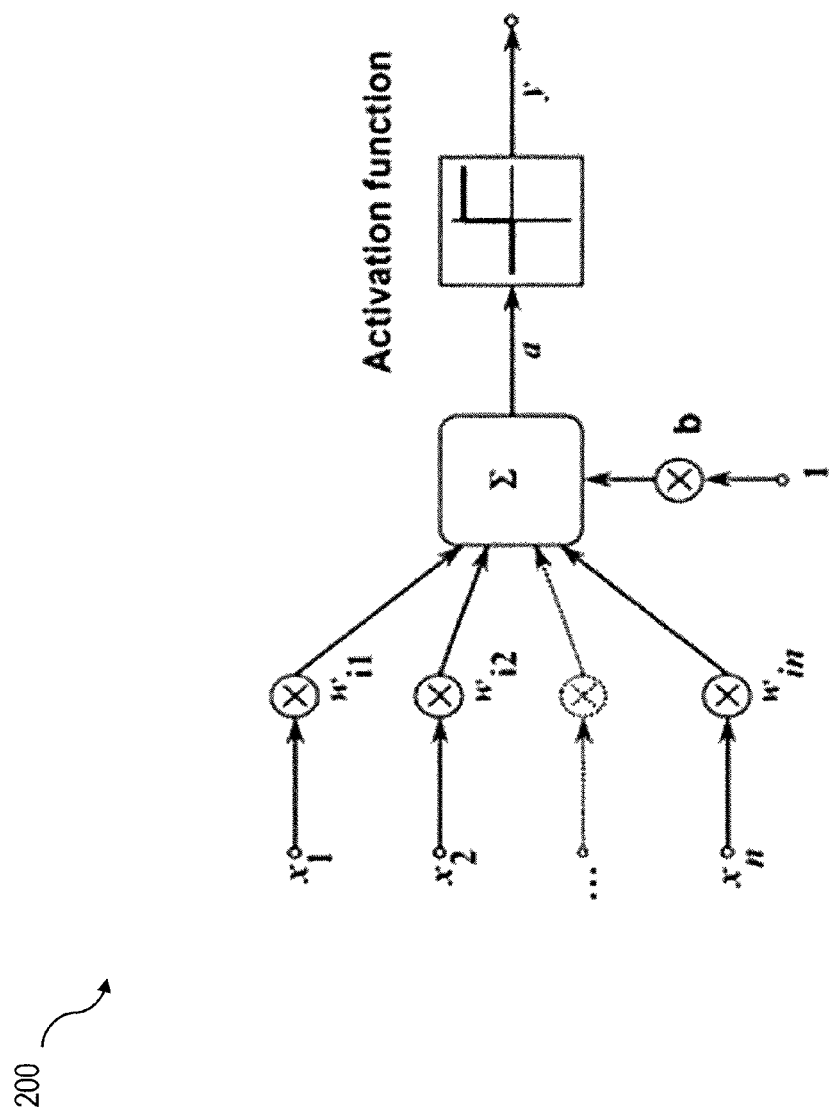
FIG. 2 is a second diagram illustrating a neural network node structure.

With reference to diagram 200 of FIG. 2, for each input layer node, its inputs are multiplied by the corresponding weights, added with a bias, then are inputted into an activation function. When there are many inputs, the multiplications consume significant processing resources. Once the outputs of the hidden layer nodes are calculated, they are used as inputs to the next layer nodes. The model score is the output of the output layer node.

Given a neural network, one can start with the calculation of the first hidden layer nodes. The inputs for the first hidden layer nodes are the input variables to the network. The output layer nodes are calculated last. The inputs of the output layer nodes are the output of the last hidden layer nodes. For typical feed forward neural networks, there is usually only one hidden layer and a couple hidden nodes. Hidden nodes rarely exceed a hundred. The input layer nodes however can vary from several to more than a thousand. In arrangements having hundreds or thousands of input nodes, most of the score calculation time is spent on the first layer hidden node calculation because these nodes have lots of inputs.

For sensitivity analysis, given each record, one can perturb (e.g., vary by a pre-defined delta, vary by a pre-defined percentage, etc.) each input variable to get the perturbed score. Each input variable x can be perturbed in the same manner. The calculation for first layer hidden node i starts with the following:

$$a_i = \sum_{j=1}^{N} w_{ij} x_j + b_i \qquad (1)$$

Here i is the index of the first layer hidden nodes, j is the index of input variables, $w_{ij}$ is the weight from input node j to hidden node i, and $b_i$ is the bias for hidden node i. This value is for the record score without any perturbation of the input variables. $a_i$ is the base output of hidden node I. It has O(N) complexity where N is the number of input nodes.

An activation function can be used to generate the final output of the node. For example, a Tan-sigmoid function can be used as the activation function.

$$\tanh(a) = \frac{e^a - e^{-a}}{e^a + e^{-a}} \qquad (2)$$

If input variable k is perturbed, the perturbed calculation will be:

$$a_i(k) = \sum_{j=1, j \neq k}^{N} w_{ij} x_j + w_{ik}(x_k + \Delta x_k) + b_i \qquad (3)$$

With the current invention, each perturbed calculation can reuse the base output $a_i$ and update it with only one multiplication as follows:

$$a_i(k) = \sum_{j=1}^{N} w_{ij} x_j + b_i + \Delta x_k * w_{ik} = a_i + \Delta x_k * w_{ik} \qquad (4)$$

By doing this, the perturbed output calculation in the first hidden layer nodes can be greatly simplified. The number of multiplications will be reduced from n to 1 where n can be hundreds or thousands. Now its complexity is only O(1). By caching the base output $a_i$, one can calculate the perturbed outputs in the first layer hidden nodes more efficiently for sensitivity analysis.

For the output layer node or second layer hidden nodes, a cached base output $a_i$ cannot be used because all the inputs for the node are perturbed. However, with many neural networks, there is usually only one hidden layer and only one output node. Thus, the first layer hidden nodes calculations include most part of the computation complexity of score calculation. Speeding up the calculation for the first layer hidden nodes will thus directly speed up the total score calculation.

Figure 3:
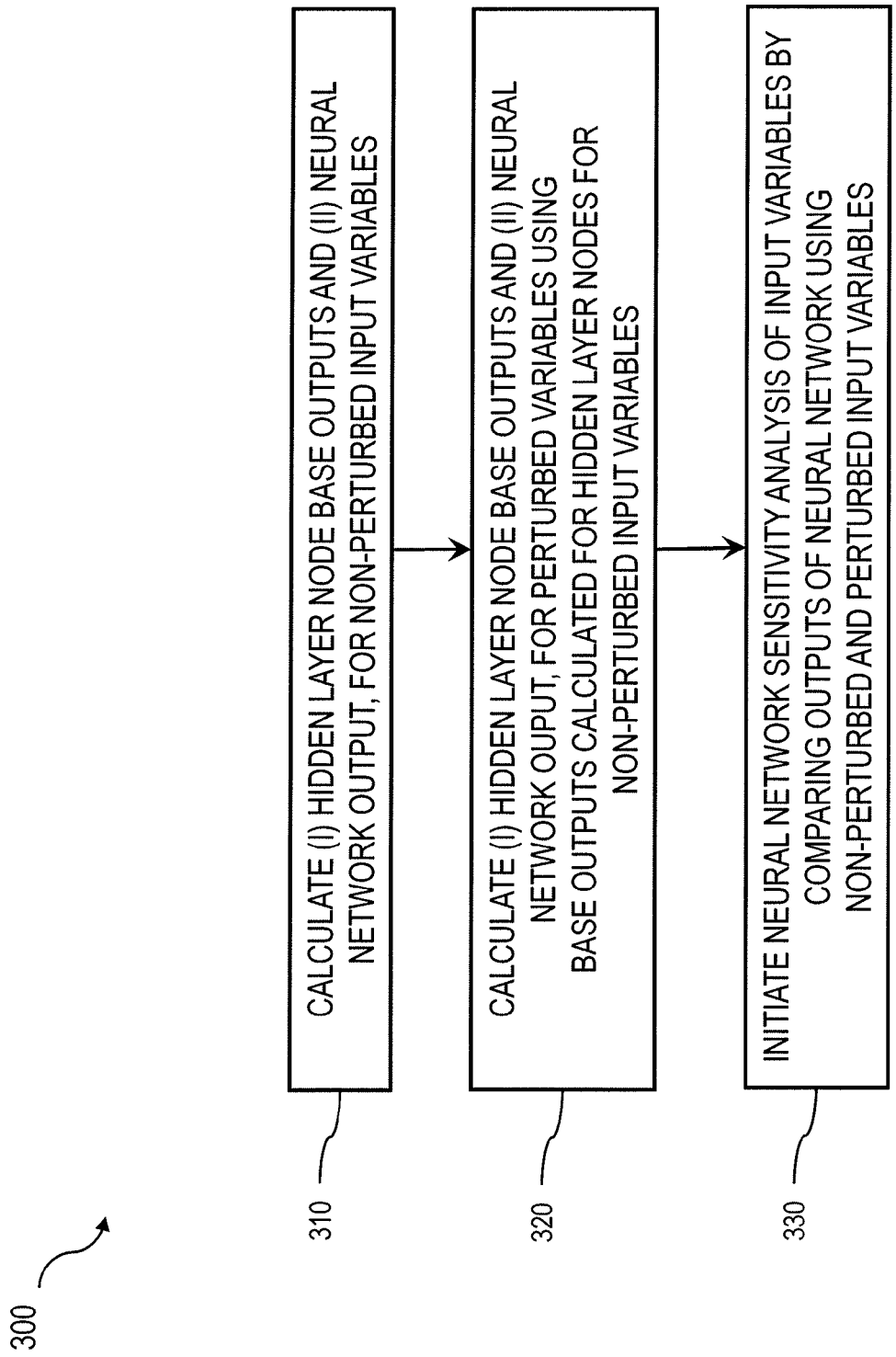
FIG. 3 is a process flow diagram illustrating a process for reducing complexity of neural network sensitivity analysis.

FIG. 3 is a diagram that illustrates an efficient way to calculate first layer hidden nodes as part of a sensitivity analysis of a neural network. Initially, at 310, given each record and each node, the base output of hidden layer node $a_i$ can be calculated as provided in equation (1) above and cached. Thereafter, at 320, given the perturbation of each variable, the perturbed output $a_i(k)$ can be calculated as in equation (4) for all k. The complexity of equation (4) is only 1/n of equation (1), where n is the number of input variables. Results from equation (1) or equation (4) will go through an activation function as in equation (2). Now we have all the perturbed outputs of first layer hidden nodes. By using equation (4) for first layer hidden node calculation, the complexity of sensitivity analysis is reduced to approximately $O(J*N)$. Next, at 330, a sensitivity analysis can be conducted by comparing the output of the neural network for the perturbed and non-perturbed input variables.

The current subject matter can be implemented by modifying a conventional API for a neural network score that take a model and a record as input, and generates one model score as an output. For a perturbed score in a conventional API, the record is perturbed with one of the input variables and sent to API in a separate call. With the current subject matter, the API for the neural network score takes the model, the base record, and all variable perturbations as input. The output will then be an array of perturbed scores, each according to one input variable perturbation.

In one example, a neural network had more than one thousand input variables. Sensitivity analysis for this neural network using approximately two million records, using conventional techniques required approximately half a day to complete. By using the techniques described herein to improve sensitivity analysis performance, the total run time of sensitivity analysis was reduced by almost a factor (i.e., it took approximately two hours).

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method for analyzing the sensitivity of a neural network implemented by one or more data processors of at least one computing system comprising:
- receiving, by at least one of the one or more data processors, a plurality of records, each record comprising input variables for a plurality of input layer nodes forming part of a neural network;
- inputting, for each record, the input variables into the input layer nodes to generate a base output for each of a plurality of first hidden layer nodes forming part of the neural network and to generate a non-perturbed output of the neural network;
- caching the generated base outputs for each of the plurality of the first hidden layer nodes;
- perturbing, for each record, each input variable;
- generating, for each record, an output for the first hidden layer nodes by reusing the corresponding cached base outputs and a perturbed output of the neural network; and
- initiating sensitivity analysis of the neural network sensitivity by comparing the non-perturbed outputs with the perturbed outputs across the input layer nodes.

2. A method as in claim 1, wherein the base outputs $a_i$ are determined using:

$$a_i = \sum_{j=1}^{N} w_{ij} x_j + b_i$$

where i is an index of the first hidden layer nodes, j is an index of input variables, x is the input variable, $w_{ij}$ is weight from input node j to hidden node i, and $b_i$ is bias for hidden node i.

3. A method as in claim 2, wherein for a perturbed input variable k that is perturbed by $\Delta$, the output for the first hidden layer nodes that reuses the corresponding cached generated base output uses:

$$a_i(k) = \sum_{j=1}^{N} w_{ij} x_j + b_i + \Delta x_k * w_{ik} = a_i + \Delta x_k * w_{ik}$$

4. The method of claim 1, further comprising:
- generating an array of perturbed scores, the perturbed scores based on a single input variable perturbation that resulted in the generated output; and
- comparing the array of perturbed scores to scores based on the non-perturbed outputs to determine the sensitivity of the neural network.

5. A non-transitory computer program product storing instructions which when executed by at least one data processor of at least one computing system result in operations comprising:
- receiving a plurality of records, each record comprising input variables for a plurality of input layer nodes forming part of a neural network;
- inputting, for each record, the input variables into the input layer nodes to generate a base output for each of a plurality of first hidden layer nodes forming part of the neural network and to generate a non-perturbed output of the neural network;
- caching the generated base outputs for each of the plurality of the first hidden layer nodes;
- perturbing, for each record, each input variable;
- generating, for each record, an output for the first hidden layer nodes by reusing the corresponding cached base outputs and a perturbed output of the neural network; and
- initiating sensitivity analysis of the neural network sensitivity by comparing the non-perturbed outputs with the perturbed outputs across the input layer nodes.

6. A non-transitory computer program product as in claim 5, wherein the base outputs $a_i$ are determined using:

$$a_i = \sum_{j=1}^{N} w_{ij} x_j + b_i$$

where i is an index of the first hidden layer nodes, j is an index of input variables, x is the input variable, $w_{ij}$ is weight from input node j to hidden node i, and $b_i$ is bias for hidden node i.

7. A non-transitory computer program product as in claim 6, wherein for a perturbed input variable k that is perturbed by $\Delta$, the output for the first hidden layer nodes that reuses the corresponding cached generated base output uses:

$$a_i(k) = \sum_{j=1}^{N} w_{ij} x_j + b_i + \Delta x_k * w_{ik} = a_i + \Delta x_k * w_{ik}$$

8. A method for analyzing the sensitivity of a neural network implemented by one or more data processors of at least one computing system comprising:
- generating, by at least one of the one or more data processors, base outputs for each of a plurality of first hidden nodes of a neural network using non-perturbed input variables;
- caching the generated base outputs for each of the plurality of the first hidden layer nodes;
- generating an output of the neural network using perturbed input variables and by reusing the cached base outputs; and
- providing data comprising the output.

9. The method of claim 8, wherein providing data comprises at least one of: displaying the data, transmitting the data to a remote computing device, loading the data into memory, and storing the data.

* * * * *